Patented June 10, 1930

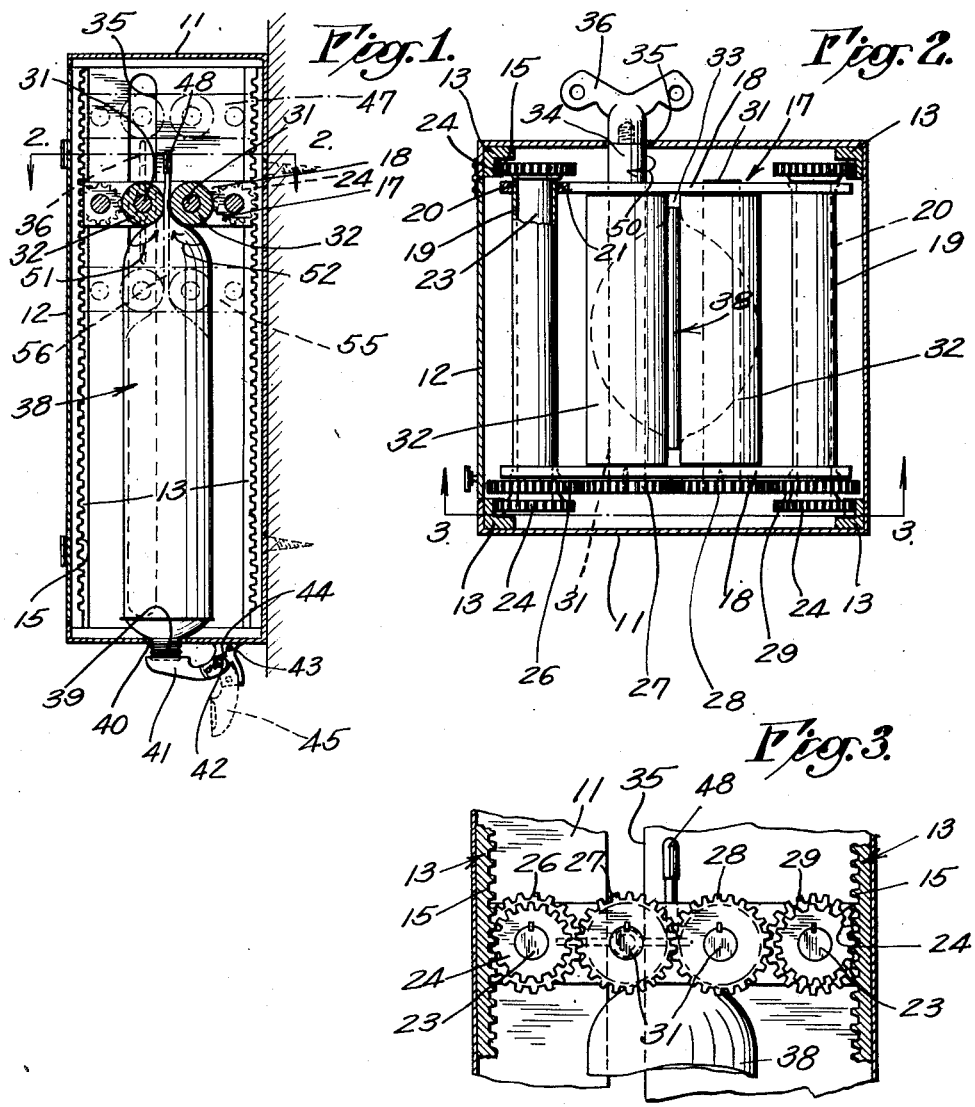
June 10, 1930.  A. C. STRAUSS ET AL  1,763,273
TOOTH PASTE DISPENSER
Filed April 2, 1928
INVENTORS:
ARTHUR C. STRAUSS,
DANIEL W. BLAIR,
By
ATTORNEY.

1,763,273

UNITED STATES PATENT OFFICE

ARTHUR C. STRAUSS AND DANIEL W. BLAIR, OF LOS ANGELES, CALIFORNIA

TOOTH-PASTE DISPENSER

Application filed April 2, 1928. Serial No. 266,599.

Our invention relates to a device for dispensing a preparation from a collapsible tube. In its present embodiment it consists of a device for dispensing tooth paste or shaving cream from the tube in which it is contained.

The usual method of applying the preparation to a brush consists in holding the brush in one hand and the tube in the other hand, the tube being squeezed to expel the preparation. Because it is most convenient, the tube is usually squeezed near the outlet end. A portion of the preparation is forced to the closed end of the tube, and it is then necessary to start from the closed end of the tube and squeeze the preparation towards the outlet end, in order that the preparation may be readily dispensed the next time. This squeezing of the preparation may be avoided by rolling up the closed end of the tube as the preparation is dispensed, but this requires more time than the user wishes to spend in the rush period before breakfast or before the theatre.

It is an object of the invention to avoid this disadvantage and the inconvenience of dispensing the preparation from a tube, by providing a device containing the collapsible tube and being operable to dispense the preparation from it.

Another object of the invention is to provide a device of the character specified, which includes means starting at the closed end of the tube and traveling along the tube towards the outlet end in such a manner as to squeeze out all of the preparation as the means advances.

A further object of our invention is to provide a device of this character, which has a carriage manually movable along the tube, and rotating rollers, which engage the tube and squeeze the preparation from it.

It is a further object of the invention to provide a device of this character, in which the adjacent sides of the expelling rollers move in a direction opposite from that of the carriage, the peripheral speed of the rollers being substantially the same speed as the carriage, so that the tube will not be pulled up or down by the rollers.

Other objects and advantages of the invention will be made evident hereinafter.

Referring to the drawings, in which we illustrate our invention,

Fig. 1 is a vertical section.

Fig. 2 is a horizontal section taken on the line 2—2 of Fig. 1.

Fig. 3 is a fragmentary vertical section taken on the line 3—3 of Fig. 2.

The form of the invention illustrated has a housing 11 provided with a door 12 at the front thereof. Placed at the four corners of the housing 11 are vertical corner posts 13. The corner posts 13 are provided with toothed racks 15, which are arranged in pairs, as shown. Placed within the housing 11 is a carriage 17 consisting of end plates 18, which are connected together by connecting tubes 19. The ends of the connecting tubes 19, as illustrated in the upper left hand corner of Fig. 2, extend through openings 20 in the end plates 18 and are riveted over, as indicated at 21. Extending through the connecting tubes 19 are shafts 23 on the opposite ends of which rack gears 24 are secured. The rack gears 24 are adapted to engage the racks 15, thus supporting the carriage 17. The shafts 23 are connected together by train gears 26 to 29 inclusive, which cause both shafts 23 to rotate at the same rate of speed, and consequently cause each one of the rack gears 24 to rotate at the same rate of speed, so that the carriage 17 will not be tilted out of a horizontal plane when it is vertically moved.

Carried by the end plates 18 of the carriage 17 are rotatable shafts 31, on which the train gears 27 and 28 are secured. These shafts 31 carry a tube collapsing means in the form of resilient pressure rollers 32. The adjacent sides of the pressure rollers 32 have a narrow space 33 provided between them. One of the shafts 31 has an extension 34, which projects through a vertical slot 35 provided in one wall of the housing 11. Secured to this extension 34 is an operating key 36, by means of which the device is operated.

As shown in Fig. 1, the collapsible tube 38 from which the preparation is to be expelled is placed in the housing 11 through the door 12. The outlet end 39 of the collapsible tube 38 is extended through an opening 40 in the lower wall of the housing 11, the original cover of the collapsible tube being at this time removed. For the purpose of keeping the mouth of the collapsible tube clean, we provide a cover 41, which is pivoted at 42 on a lug 43 attached to a lower wall of the housing 11. A spring 44 is provided for maintaining the cover either in the closed position, as indicated by full lines in Fig. 1, or in open position, as indicated by dotted lines in Fig. 1.

When the tube is first placed in the housing 11, the carriage must be moved into the top end of the housing 11, as indicated by dotted lines 47. The tube is then held in the position shown by full lines 38 in Fig. 1, and the key 36 is turned, so as to move the carriage downward. The closed end 48 of the tube 38 is extended through the narrow opening 33 between the pressure rollers 32. It will be noted that this space 33 is just wide enough to receive the walls of the tube 38. When it is desired to dispense the preparation from the tube 38, the cover 41 is swung into dotted line position 45 and the key 36 is rotated in a direction indicated by the arrow 50 of Fig. 2. This causes the carriage to move downward and causes the rollers to rotate in the directions indicated by the arrows 51 and 52 of Fig. 1.

The opposite walls of the tube 38 are forced together and the preparation is squeezed through the mouth of the tube. As previously pointed out, the peripheral speed of the rollers 32 is the same as the rate of travel of the carriage 17. By so fixing the relative speeds of these parts, the tube 38 will be neither lifted nor forced downward as a result of the action of the rollers 32 on the tube. As the preparation is dispensed, the carriage and associated mechanism pass downward into the position indicated by dotted lines 55 of Fig. 1, so that the tube is collapsed, as indicated by dotted lines 56. This downward movement is continued until the carriage reaches a lowermost position in the housing 11, and the preparation is fully squeezed from the tube 38.

From the foregoing description, it will be seen that the device provided by our invention is very easy to operate and does not waste any of the preparation. The device may be in a convenient location and the preparation may be easily expelled and applied to a brush by the simple operation of swinging the cover 41 into open position, holding the brush below the mouth 39 of the tube 38 and turning the key 36 with the other hand.

We claim as our invention:

1. In a dispensing device of the class described, the combination of: a housing having corner supports and a base; racks secured to said supports, said base forming the support for the feeding end of a collapsible tube; a carriage operable in said housing; shafts mounted in the opposite ends of said carriage; gears carried by said shafts and adapted to engage with said racks to move said carriage relative to said housing; a pair of shafts arranged in said carriage between said end shafts; rollers carried by said intermediate shafts and being spaced apart for the introduction therebetween of the closed end of said tube; and gears mounted on one end of said intermediate shafts adapted for synchronous operation with the gears at one end of said carriage to move said rollers relative to said tube, whereby said rollers are rotated in a direction opposite to that of the movement of said carriage.

2. In a dispensing device of the class described, the combination of: a housing having corner supports and a base; racks secured to said supports, said base forming the support for the feeding end of a collapsible tube; a carriage operable in said housing; shafts mounted in the opposite ends of said carriage; gears disposed on the ends of said shafts adapted for engagement with said racks to move said carriage relative to said housing; a pair of shafts mounted in said carriage between the said end shafts; gears disposed on one end of said intermediate shafts adapted for engagement with the gears on one end of said end shafts; and rollers mounted on said intermediate shafts and being spaced apart to receive the closed end of said tube, the tube contacting surfaces of said rollers being movable in the opposite direction to that of the movement of said carriage.

3. In a dispensing device of the class described, the combination of: a housing having corner supports and a base; racks secured to said supports, said base forming the support for the feeding end of a collapsible tube; shafts journalled in the ends of said carriage; gears disposed on the opposite ends of said shafts and engaging said racks for moving said carriage relative to said housing; a pair of shafts journalled intermediate said end shafts; rollers mounted on said intermediate shafts and being spaced apart for the introduction therebetween of the closed end of said tube; gears on one end of said intermediate shafts and engaging with the gears on one end of said end shafts; and an extension on one of said intermediate shafts carrying means for operating said gears.

4. In a dispensing device of the class described, the combination of: a housing having corner supports and a base; racks secured to said supports, said base forming the support for the feeding end of a collapsible tube; shafts journalled in the ends of said carriage; gears connected to the ends of said shafts and engaging with said racks for moving said carriage relative to said housing; a pair of shafts mounted in said carriage intermediate said end shafts; rollers carried by said intermediate shafts and adapted to receive therebetween the closed end of said tube; gears mounted on one end of said intermediate shafts, said last mentioned gears adapted for synchronous operation with the gears on one end of said end shafts to move the tube contacting surfaces of said rollers in the opposite direction from the movement of said carriage; and a key on one of said intermediate shafts adapted for operating said gears and holding said tube in a fixed position during the movement of said carriage.

5. In a dispensing device of the class described, the combination of: a housing having corner supports and a base for supporting the feeding end of a collapsible tube; racks secured to said corner supports; a carriage movable in said housing; shafts arranged in the ends of said carriage; gears mounted on said shafts engaging said racks for moving said carriage relative to said housing; a pair of shafts disposed in said carriage intermediate said end shafts; gears on one end of said intermediate shafts engaging with the gears on one end of said end shafts; and expelling rollers carried by said intermediate shafts and being spaced apart to receive the closed end of said tube, the adjacent surfaces of said rollers being adapted to move in a direction opposite from that of said carriage and the peripheral speed of said rollers being substantially the same as said carriage, so that the said tube will not be moved by said rollers.

In testimony whereof, we have hereunto set our hands at Los Angeles, California, this 28th day of March, 1928.

ARTHUR C. STRAUSS.
DANIEL W. BLAIR.